United States Patent
Park et al.

(10) Patent No.: US 9,732,973 B2
(45) Date of Patent: Aug. 15, 2017

(54) AIR CONDITIONER AND METHOD OF CONTROLLING THE SAME

(71) Applicant: SAMSUNG ELECTRONICS CO., LTD., Suwon-si, Gyeonggi-do (KR)

(72) Inventors: Hee Il Park, Incheon (KR); Seon Uk Na, Yongin-si (KR); Kyung Tae No, Seoul (KR); In Jung Baek, Yongin-si (KR); Dong Kue Lee, Pyeongtaek-si (KR); Yong Gak Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 596 days.

(21) Appl. No.: 14/339,740

(22) Filed: Jul. 24, 2014

(65) Prior Publication Data

US 2015/0147953 A1  May 28, 2015

(30) Foreign Application Priority Data

Nov. 25, 2013 (KR) .................. 10-2013-0143792

(51) Int. Cl.
| | |
|---|---|
| F24F 11/00 | (2006.01) |
| F24F 7/007 | (2006.01) |
| F04D 27/00 | (2006.01) |
| F24F 1/00 | (2011.01) |

(52) U.S. Cl.
CPC .......... F24F 11/001 (2013.01); F04D 27/004 (2013.01); F24F 1/0018 (2013.01); F24F 7/007 (2013.01); F24F 11/0001 (2013.01)

(58) Field of Classification Search
CPC .................................................. F24F 11/001
USPC ................................................ 318/3, 34, 558
See application file for complete search history.

(56) References Cited

U.S. PATENT DOCUMENTS 8,054,018 B2 * 11/2011 Jeung ............... F04D 27/004
                                                      165/200
2009/0134823 A1  5/2009 Jeung

FOREIGN PATENT DOCUMENTS

| EP | 1801511 | 6/2007 |
|---|---|---|
| JP | 2009-236445 | 10/2009 |

OTHER PUBLICATIONS

Extended European Search Report dated May 4, 2015 from European Patent Application No. 14185424.0, 5 pages.

* cited by examiner

*Primary Examiner* — David S Luo
(74) *Attorney, Agent, or Firm* — Staas & Halsey LLP (57) ABSTRACT

An air conditioner includes an indoor fan motor driven according to a signal to control the indoor fan motor by a controller, and a controller that resets a reference value of a rated air flow rate according to the pre-set conditions by checking an indoor fan motor driving voltage when an indoor fan motor RPM reaches a reference value of a strong wind mode while the air conditioner operates in strong wind mode. The controller compares the checked indoor fan motor driving voltage with a reference indoor fan motor driving voltage of the rated air flow rate, and resets the reference value when the checked indoor fan motor driving voltage is different from the reference indoor fan motor driving voltage of the rated air flow rate.

23 Claims, 10 Drawing Sheets

AIR CONDITIONER AND METHOD OF CONTROLLING THE SAME

CROSS-REFERENCE TO RELATED APPLICATIONS

This application claims the benefit of Korean Patent Application No. 10-2013-0143792, filed on Nov. 25, 2013 in the Korean Intellectual Property Office, the disclosure of which is incorporated herein by reference.

BACKGROUND

1. Field

Embodiments disclosed herein relate to air conditioners and methods of controlling the same.

2. Description of the Related Art

In general, an air conditioner refers to an apparatus for conditioning air using a refrigeration cycle and may include an indoor fan and an indoor heat exchanger installed in a body defining an appearance of the air conditioner. The air conditioner may cool or heat an indoor space by suctioning indoor air into the body via the indoor fan and cooling or heating air that has passed through the indoor heat exchanger.

The air conditioner may further include an inlet to suction air from the indoor space and an outlet to discharge air heat-exchanged by the indoor heat exchanger into the indoor space at outer portions of the body. A variety of filters to filter impurities such as dust contained in the air suctioned into the body and to clean the air may be installed at an inner portion of the inlet.

After a long term use of the air conditioner, impurities such as dust stacked on the filters may change an air flow rate of the fan. Furthermore, the air flow rate of the fan may also be changed according to installation conditions of the air conditioner (e.g., duct conditions such as the length of the duct system or configuration of the duct system, when a system air conditioner is installed in a building).

SUMMARY

Therefore, it is an aspect of the disclosure to provide air conditioners and methods of controlling the same to maintain a discharge air flow rate at a uniform level by automatically determining static pressure in accordance with an environment change of the air conditioner.

Additional aspects of the disclosure will be set forth in part in the description which follows and, in part, will be apparent from the description, or may be learned by practice of the disclosure.

In accordance with an aspect of the disclosure, an air conditioner may include an indoor fan motor driven according to a signal to control the indoor fan motor by a controller, and a controller to reset a reference value of a rated air flow rate according to pre-set conditions based on an indoor fan motor driving voltage and an indoor fan motor RPM when a request for resetting driving conditions is input by a user, or to reset the reference value of the rated air flow rate according to the pre-set conditions by checking the indoor fan motor driving voltage when the indoor fan motor RPM reaches a reference value of the strong wind mode while the air conditioner operates in strong wind mode, comparing the checked indoor fan motor driving voltage with a reference indoor fan motor driving voltage of the rated air flow rate, and resetting the reference value when the checked indoor fan motor driving voltage is different from the reference indoor fan motor driving voltage of the rated air flow rate.

The controller may include a driving mode controller to control the air conditioner to turn (change) into a driving condition setting mode and operate in an indoor fan-only mode under a non-feedback control state when the reference value of the rated air flow rate is to be adjusted while the air conditioner operates in the strong wind mode, a state checking unit to check an indoor fan motor driving voltage of the air conditioner in real time, a driving condition setting unit to set the reference value of the rated air flow rate based on the indoor fan motor driving voltage and the indoor fan motor RPM checked by the state checking unit in indoor fan-only mode under the non-feedback control state, and a motor controller to control driving of the indoor fan motor based on the reference value of the rated air flow rate set by the driving condition setting unit.

The air conditioner may further include a counting unit to manage a count value corresponding to the indoor fan motor RPM and check the count value increasing or decreasing in accordance with the indoor fan motor RPM when the state checking unit checks the indoor fan motor RPM to reset the reference value of the rated air flow rate.

The state checking unit may calculate a current indoor fan motor driving voltage by adding an initial indoor fan motor driving voltage and a product obtained by multiplying a current count value counted by the counting unit by a variation of the indoor fan motor driving voltage.

The driving condition setting unit may compare an average indoor fan motor RPM with a target indoor fan motor RPM in indoor fan-only mode under the non-feedback control state, and set the reference value of the rated air flow rate based on a corresponding indoor fan motor RPM when the average indoor fan motor RPM is less than the target indoor fan motor RPM.

The driving condition setting unit may compare an average indoor fan motor RPM with a target indoor fan motor RPM in indoor fan-only mode under the non-feedback control state, and request the state checking unit to check the state when the average indoor fan motor RPM is greater than the target indoor fan motor RPM.

The turning (changing) into the driving condition setting mode may be performed by the user's request or may be automatically performed when the indoor fan motor driving voltage during the strong wind mode is different from a reference indoor fan motor driving voltage of the rated air flow rate.

In accordance with an aspect of the disclosure, a method of controlling an air conditioner may include operating in a strong wind mode, comparing an indoor fan motor driving voltage with a reference driving voltage of a rated air flow rate when an indoor fan motor RPM reaches a reference value of the strong wind mode, storing a current count value of a current indoor fan motor RPM as a reference count value when the indoor fan motor driving voltage is different from the reference indoor fan motor driving voltage of the rated air flow rate, turning into driving condition setting mode and operating in indoor fan-only mode, calculating a current indoor fan motor driving voltage, comparing an average indoor fan motor RPM with a target indoor fan motor RPM, comparing a current indoor fan motor RPM with a minimum indoor fan motor RPM when the average indoor fan motor RPM is less than the target indoor fan motor RPM based on the comparison result, and setting the current state as the reference value of the rated air flow rate when the current indoor fan motor RPM is identical to the minimum indoor fan motor based on the comparison result.

The air conditioner may turn into a non-feedback control state in the operating in the indoor fan-only mode.

In the calculating of the current indoor fan motor driving voltage, the current indoor fan motor driving voltage may be calculated by adding an initial indoor fan motor driving voltage and a product obtained by multiplying a current count value by a variation of the indoor fan motor driving voltage.

The setting of the current state as the reference value of the rated air flow rate may be performed by setting the current indoor fan motor RPM as a reference indoor fan motor RPM of the strong wind mode, and setting reference indoor fan motor RPMs of the other wind modes according to pre-set conditions based on the set reference indoor fan motor RPM of the strong wind mode.

The method may further include comparing the current indoor fan motor driving voltage with a maximum indoor fan motor driving voltage, and setting the current state as the reference value of the rated air flow rate when the current indoor fan motor driving voltage is greater than the maximum indoor fan motor driving voltage based on the comparison result, after the comparing of the average indoor fan motor RPM with the target indoor fan motor RPM, when the average indoor fan motor RPM is greater than (or equal to) the target indoor fan motor RPM.

The method may further include increasing the current count value by one level and restarting from the calculating of the current indoor fan motor driving voltage, when the current indoor fan motor driving voltage is less than (or equal to) the maximum indoor fan motor driving voltage.

The method may further include decreasing the current count value by one level and restarting from the calculating of the current indoor fan motor driving voltage, when the current indoor fan motor RPM is different from the minimum indoor fan motor RPM.

In accordance with an aspect of the disclosure, a method of controlling an air conditioner may include turning into driving condition setting mode and operating in indoor fan-only mode, calculating a current indoor fan motor driving voltage, comparing an average indoor fan motor RPM with a target indoor fan motor RPM, setting a current state as a reference value of the rated air flow rate when the average indoor fan motor RPM is less than the target indoor fan motor based on the comparison result.

The air conditioner may turn into a non-feedback control state in the operating in indoor fan-only mode.

In the calculating of the current indoor fan motor driving voltage, the current indoor fan motor driving voltage may be calculated by adding an initial indoor fan motor driving voltage and a product obtained by multiplying a current count value by a variation of the indoor fan motor driving voltage.

The setting of the current state as the reference value of the rated air flow rate may be performed by setting the current indoor fan motor RPM as a reference indoor fan motor RPM of the strong wind mode, and setting reference indoor fan motor RPMs of the other wind modes according to pre-set conditions based on the set reference indoor fan motor RPM of the strong wind mode.

The method may further include comparing a current indoor fan motor driving voltage with a maximum indoor fan motor driving voltage, and setting the current state as the reference value of the rated air flow rate when the current indoor fan motor driving voltage is greater than the maximum indoor fan motor driving voltage based on the comparison result, after the comparing of the average indoor fan motor RPM with the target indoor fan motor RPM, when the average indoor fan motor RPM is greater than (or equal to) the target indoor fan motor RPM.

The method may further include increasing the current count value by one level and restarting from the calculating of the current indoor fan motor driving voltage, when the current indoor fan motor driving voltage is less than the maximum indoor fan motor driving voltage.

In accordance with an aspect of the disclosure, an air conditioner may include an indoor fan motor driven in response to a control signal, and a controller to provide the control signal to the indoor fan motor. The controller may include a driving mode controller to control the air conditioner to change into a driving condition setting mode and to operate in an indoor fan-only mode under a non-feedback control state, and a driving condition setter to determine whether an average indoor fan motor RPM is less than a target indoor fan motor RPM when the air conditioner operates in the indoor fan-only mode under the non-feedback control state, to determine whether a current indoor fan motor RPM is equal to a minimum indoor fan motor RPM when it is determined the average indoor fan motor RPM is less than the target indoor fan motor RPM, and to set a current state as a reference value of a rated air flow rate to maintain a desired air flow rate of the air conditioner when it is determined the current indoor fan motor RPM is equal to the minimum indoor fan motor RPM.

The driving condition setter may determine whether a current indoor fan motor driving voltage is greater than a maximum indoor fan motor driving voltage Vccmax when it is determined the average indoor fan motor RPM is not less than the target indoor fan motor RPM, and may set a current state as a reference value of a rated air flow rate to maintain the desired air flow rate of the air conditioner when it is determined the current indoor fan motor driving voltage is greater than the maximum indoor fan motor driving voltage Vccmax.

The driving mode controller may control the air conditioner to change into the driving condition setting mode and to operate in the indoor fan-only mode when the air conditioner operates in a strong wind mode and an indoor fan motor driving voltage differs from a reference fan motor driving voltage of the desired air flow rate.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Reference will now be made in detail to embodiments of the disclosure, examples of which are illustrated in the accompanying drawings, wherein like reference numerals refer to like elements throughout. In the description of the disclosure, certain detailed explanations of related art are omitted when it is deemed that they may unnecessarily obscure the essence of the disclosure. It will be understood that although the terms "first", "second", etc. may be used herein to describe various components, these components should not be limited by these terms. These components are only used to distinguish one component from another.

Hereinafter, exemplary embodiments of the disclosure will be described in detail with reference to the attached drawings.

Figure 1:
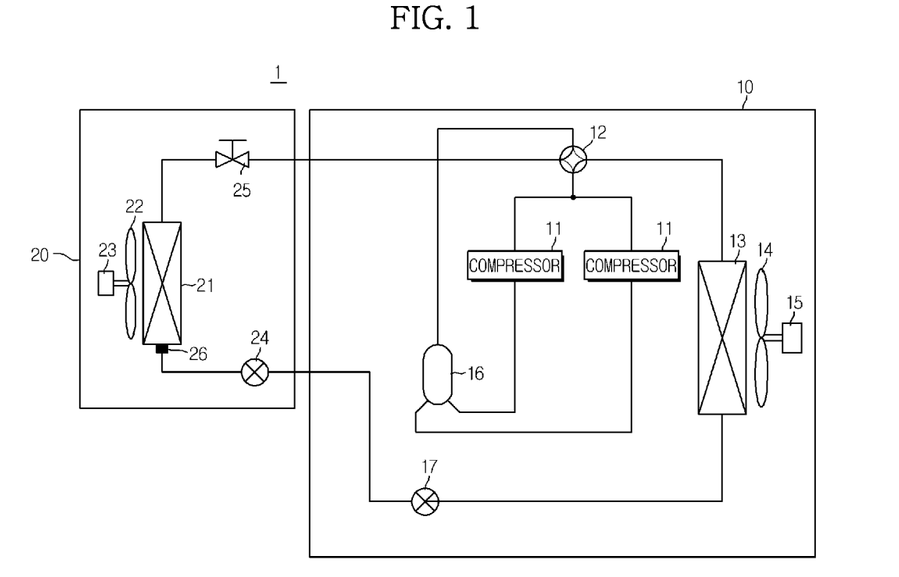
FIG. 1 is a diagram illustrating a structure of an air conditioner.

FIG. 1 is a diagram illustrating an example structure of an air conditioner 1.

Referring to FIG. 1, the air conditioner 1 may include an outdoor unit 10 and an indoor unit 20. In this regard, the outdoor unit 10 and the indoor unit 20 may be connected with each other such that power and communication signals are transmitted and received therebetween.

The outdoor unit 10 may include a compressor 11 to compress a refrigerant to a high-temperature and high-pressure gas state, a four-way valve 12 to control a direction of a flow of the high-temperature and high-pressure refrigerant gas compressed by the compressor 11, an outdoor heat exchanger 13 to receive the high-temperature and high-pressure refrigerant gas compressed by the compressor 11 and perform heat-exchange between the refrigerant gas and external air, an outdoor fan 14 to forcibly blow outdoor air by using an outdoor fan motor 15 such that heat is exchanged by the outdoor heat exchanger 13, and an electronic expansion valve (EEV) 17 to expand the heat-exchanged refrigerant under reduced pressure while adjusting a flow rate of the refrigerant. Here, the electronic expansion valve (EEV) 17 may control a superheating degree and a supercooling degree according to a degree of opening thereof. In addition, an accumulator 16 that converts the refrigerant entering the compressor 11 into a complete gaseous state may be installed at a suction side of the compressor 11.

In addition, the indoor unit 20 may include an indoor heat exchanger 21 to receive the refrigerant and exchange heat with indoor air and an indoor fan 22 to forcibly blow indoor air using an indoor fan motor 23 such that heat is exchanged by the indoor heat exchanger 21. In addition, an electronic expansion valve 24 to expand the refrigerant and an indoor heat exchanger temperature sensor 26 to sense temperature of an inlet pipe of the indoor heat exchanger 21 may be installed at the inlet pipe through which the refrigerant is sucked during cooling operation among the pipes connected to the indoor heat exchanger 21. Furthermore, a refrigerant-controlling valve 25 to control the flow of the refrigerant may be installed at an outlet pipe through which the refrigerant is discharged during a cooling operation among the pipes connected to the indoor heat exchanger 21.

Figure 2:
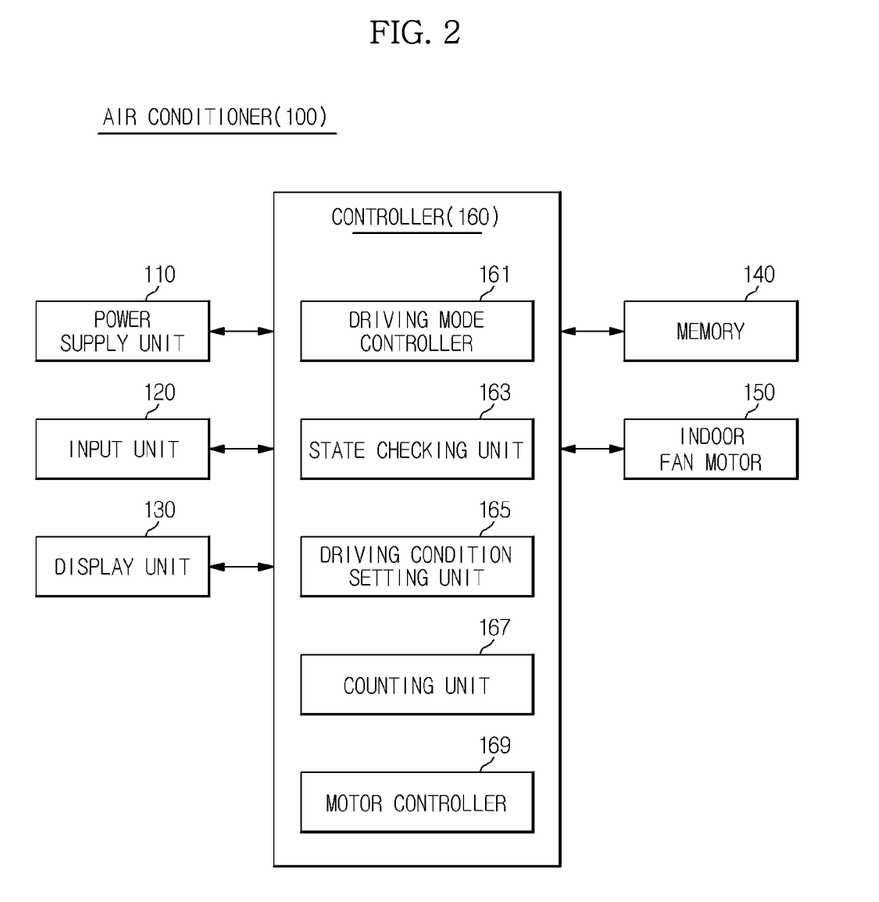
FIG. 2 is a block diagram illustrating an air conditioner.

FIG. 2 is a block diagram illustrating an air conditioner 100.

Hereinafter, the air conditioner 100 according to an embodiment of the disclosure will be described with reference to FIGS. 5 through 7 which are graphs for describing a method of controlling the air conditioner.

Referring to FIG. 2, the air conditioner 100 may include a power supply unit 110, an input unit 120, a display unit 130, a memory 140, an indoor fan motor 150, and a controller 160. The air conditioner 100 may automatically determine a static pressure in accordance with an environmental change to maintain a discharge air flow rate at an optimal level. In this regard, the static pressure may refer to a resistance (mmAq or Pa) to an air flow between a position in the front side of the indoor unit and a position in the back side of the indoor unit and may include resistance applied to a pipe. The static pressure may be formed by impurities such as dust. In a system air conditioner installed in a building, static pressure may be determined according to a duct installation environment (e.g., a pipe length, pipe diameter, conditions for a curved portion(s), conditions for changes direction of the duct, and the like).

More particularly, the power supply unit 110 may convert a commercial AC voltage supplied from an AC power source (not shown) into a predetermined DC voltage required to operate the indoor unit and output the DC voltage.

The input unit 120 may include a front panel mounted on a body (not shown) or a remote control having a plurality of keys through which an operation mode requested by a user may be input. For example, an operation selecting a function selection mode (e.g., function selection mode such as strong wind mode, medium wind mode, mild wind mode, and turbo mode, auto mode, cooling mode, drying mode, fan-only mode, and heating mode, etc.), an operation start/stop instruction, a desired temperature, a selected wind type, duration of operation, and the like, may be input. As stated above, the input unit 120 may be embodied as a front panel mounted on a body of the air conditioner or a control panel disposed separately, or a remote control. The input unit 120 may include a user interface which may include, for example, one or more of a keyboard, a mouse, a joystick, a button, a switch, an electronic pen or stylus, a gesture recognition sensor (e.g., to recognize gestures of a user including movements of a body part), an input sound device or voice recognition sensor (e.g., a microphone to receive a voice command), a track ball, a smart phone, a tablet PC, a pedal or footswitch, a virtual-reality device, and so on. The user interface may further include a haptic device to provide haptic feedback to a user. The user interface may also include a touch screen, for example. By way of example only, a smart phone, tablet PC, laptop, etc. may include an application to control an operation of the air conditioner remotely.

The display unit 130 may display an operation state of the air conditioner 100 so that a user may check the operation state thereof. For example, the display unit 130 may display the operation mode, the desired temperature, or the like, input through the input unit 120, or an error, or the like, occurring in the air conditioner 100. The display may include a liquid crystal display (LCD), a light emitting diode (LED) display, an organic light emitting diode (OLED) display, active matrix organic light emitting diode (AMOLED), flexible display, 3D display, a plasma display panel (PDP), a cathode ray tube (CRT) display, and the like, for example. However, the disclosure is not limited to these example displays and may include other types of displays.

The memory 140 may store a variety of information related to the air conditioner 100. The memory 140 may be embodied as a storage medium, such as a nonvolatile memory device, such as a Read Only Memory (ROM), Programmable Read Only Memory (PROM), Erasable Programmable Read Only Memory (EPROM), and flash memory, a USB drive, a volatile memory device such as a Random Access Memory (RAM), a hard disk, floppy disks, a blue-ray disk, or optical media such as CD ROM discs and DVDs, or combinations thereof. However, examples of the memory are not limited to the above description, and the memory may be realized by other various devices and structures as would be understood by those skilled in the art.

The indoor fan motor 150 may be driven in response to an indoor fan motor-controlling signal from the controller 160.

When a request for resetting driving conditions is input by the user, the controller 160 may reset a reference value of the rated air flow rate according to pre-set conditions based on an indoor fan motor driving voltage and an indoor fan motor RPM. Alternatively, when the indoor fan motor RPM reaches a reference value of the strong wind mode while operating in strong wind mode, the controller 160 may check an indoor fan motor driving voltage, compare the checked indoor fan motor driving voltage with a reference indoor fan motor driving voltage of the rated air flow rate, and reset the reference value of the rated air flow rate according to the pre-set conditions if the checked indoor fan motor driving voltage is different from that of the rated air flow rate. In this regard, the request for resetting the driving conditions input by the user may be a request for resetting a reference value of the rated air flow rate according to a duct environment in a building when the air conditioner is installed. However, embodiments of the disclosure are not limited thereto, and the driving conditions may also be changed when a duct environment is changed.

As illustrated in FIG. 2, the controller 160 may include a driving mode controller 161, a state checking unit 163 (state checker), a driving condition setting unit 165 (driving condition setter), a counting unit 167 (counter), and a motor controller 169.

In more detail, when the reference value of the rated air flow rate is required to be adjusted while the air conditioner operates in strong wind mode, the driving mode controller 161 may control the air conditioner to turn (change) into a driving condition setting mode and operate in an indoor fan-only mode under a non-feedback control state. The turning (changing) into the driving condition setting mode may be performed by the user's request or may be automatically performed when the indoor fan motor driving voltage during the strong wind mode is different from a reference indoor fan motor driving voltage of the rated air flow rate (e.g., when the difference between the indoor fan motor driving voltage during the strong wind mode and the reference indoor fan motor driving voltage of the rated air flow rate is greater than a predetermined threshold). In addition, the non-feedback control state may refer to a state of not receiving any control signals other than signals from the outdoor unit, such as signals from a wireless remote control, an autokey, a wired remote control, and a repeater. Here, errors other than indoor fan errors may also be disabled.

The state checking unit 163 may check the indoor fan motor driving voltage of the air conditioner 100 in real time. In this regard, the state checking unit 163 may calculate a current indoor fan motor driving voltage by adding an initial indoor fan motor driving voltage and a product obtained by multiplying a current count value counted by the counting unit 167 by a variation of the indoor fan motor driving voltage.

The driving condition setting unit 165 may set the reference value of the rated air flow rate based on the indoor fan motor driving voltage and the indoor fan motor RPM checked by the state checking unit 163 during the indoor fan-only mode under the non-feedback control state.

In addition, the driving condition setting unit 165 may compare an average indoor fan motor RPM with a target indoor fan motor RPM during the indoor fan-only mode under the non-feedback control state. When the average indoor fan motor RPM is less than the target indoor fan motor RPM, the reference value of the rated air flow rate may be set based on the indoor fan motor RPM.

After the driving condition setting unit 165 compares the average indoor fan motor RPM with the target indoor fan motor RPM during the indoor fan-only mode under the non-feedback control state, when the average indoor fan motor RPM is greater than (or equal to) the target indoor fan motor RPM, the driving condition setting unit 165 may request the state checking unit 163 to check the state.

In addition, the driving condition setting unit 165 may set initial indoor fan motor driving voltages corresponding to conditions of respective capacities of the air conditioner 100. For example, the driving condition setting unit 165 may set an initial indoor fan motor driving voltage Vcc0 and a maximum indoor fan motor driving voltage Vccmax.

The counting unit 167 may manage the count value corresponding to the indoor fan motor RPM and may check the count value that increases or decreases in accordance with the indoor fan motor RPM when the state checking unit 163 checks the indoor fan motor RPM to reset the reference value of the rated air flow rate.

The motor controller 169 may control driving of the indoor fan motor 150 based on the reference value of the rated air flow rate set by the driving condition setting unit 165.

That is, the controller 160 may set the reference value of the rated air flow rate based on a principle in which a discharge air flow rate is reduced when the static pressure increases under the condition that the output from the indoor fan motor is fixed, thereby reducing a torque and increasing the indoor fan motor RPM.

Figure 5:
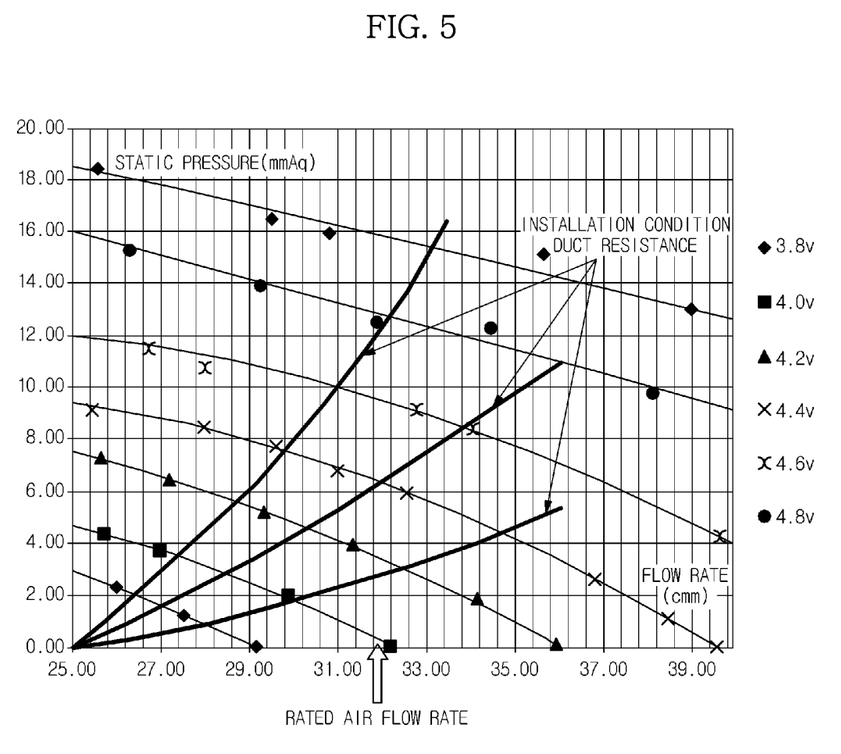
FIGS. 5 to 7 are graphs for describing a method of controlling an air conditioner.
Figure 6:
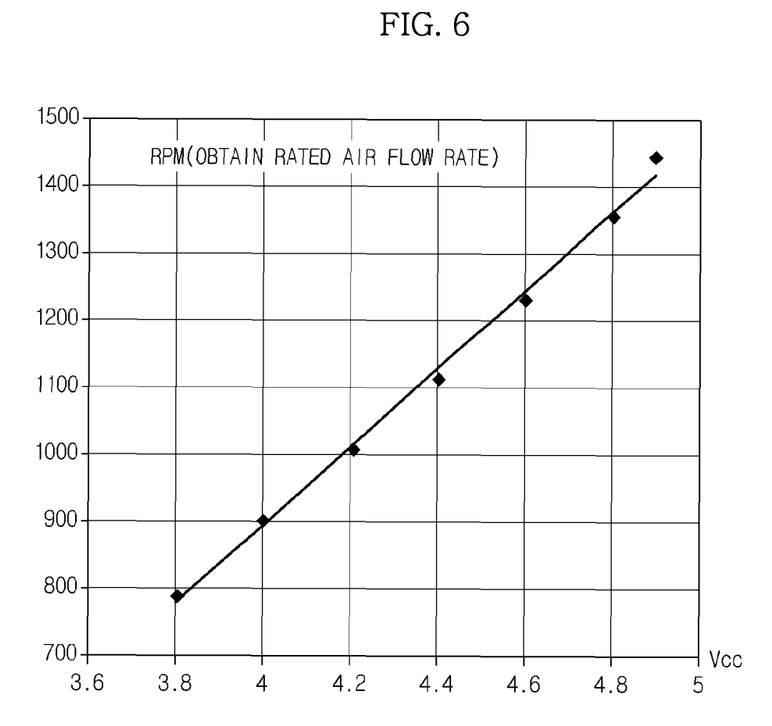

Referring to FIGS. 5 and 6, when air flow rates, static pressures, and driving voltages of the indoor fan motor are as illustrated in FIG. 5, test results of rated air flow rate of 32 cmm (cubic meter per minute) are illustrated in FIG. 6. Since a linear relationship is observed between the indoor fan motor driving voltage and the indoor fan motor RPM, the rated air flow rate is obtained as illustrated in FIG. 6. When the indoor fan motor RPM according to a reference discharge air flow rate is fixed, and the indoor fan motor driving voltage is similar to the reference indoor fan motor driving voltage output, it is determined that the indoor fan motor RPM is an optimal level.

Figure 7:
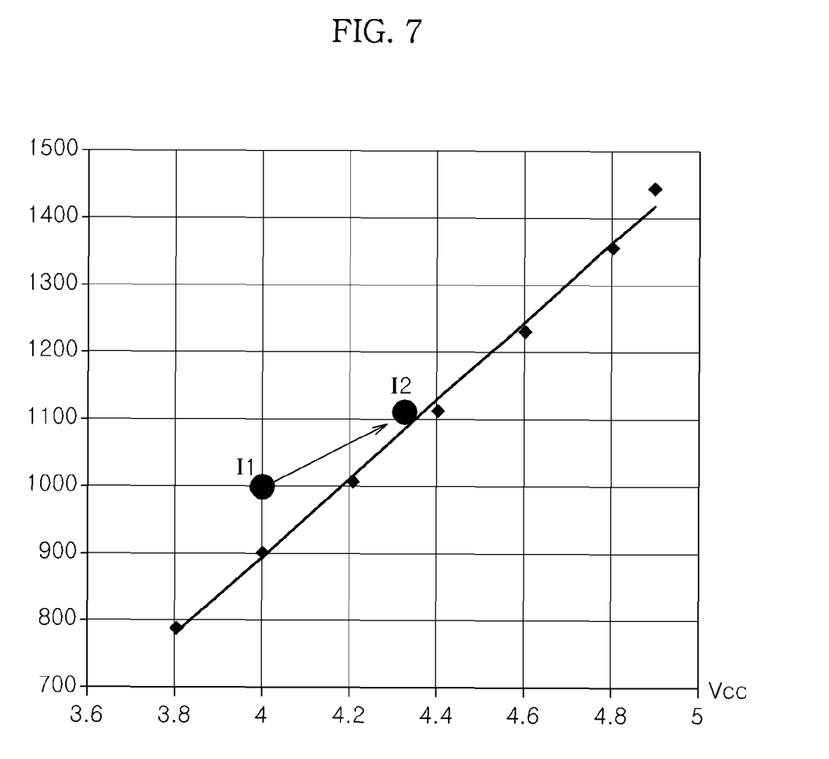

However, when the indoor fan motor RPM and the indoor fan motor driving voltage do not satisfy the reference value of the rated air flow rate as 11 of FIG. 7, the reference value of the rated air flow rate may be reset as 12 of FIG. 7 by adjusting the indoor fan motor driving voltage.

Figure 3:
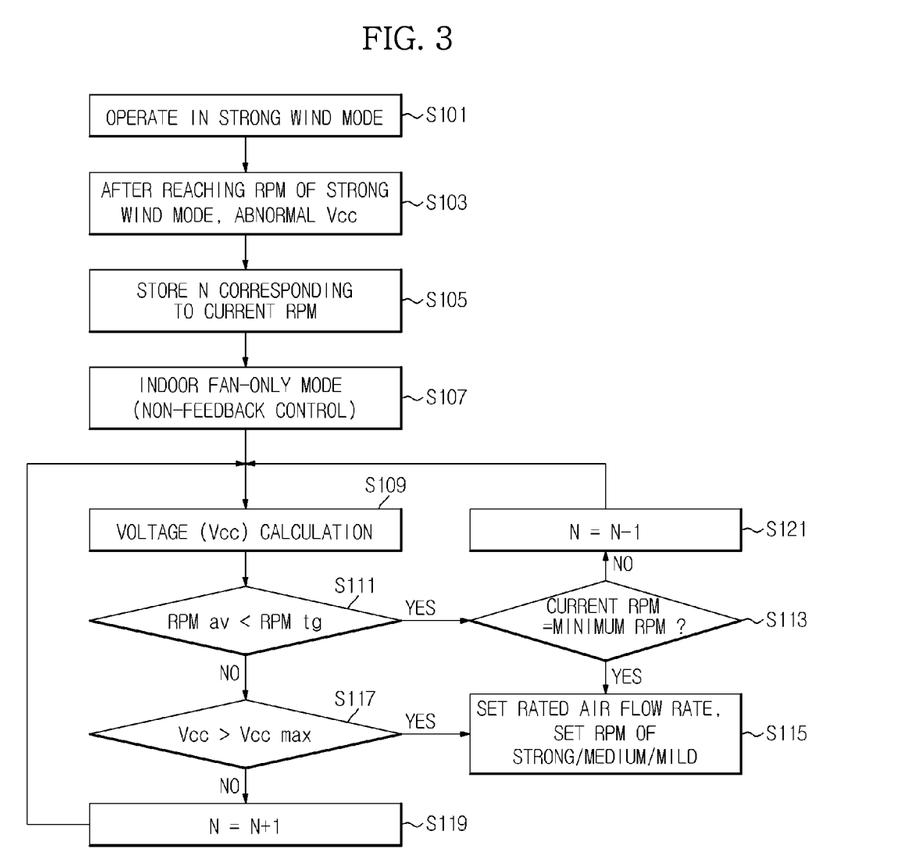
FIG. 3 is a flowchart for describing a method of controlling an air conditioner according to an embodiment of the disclosure.

FIG. 3 is a flowchart for describing a method of controlling an air conditioner according to an embodiment of the disclosure.

For example, when the air conditioner 100 operates in strong wind mode (S101), the indoor fan motor RPM may reach a reference value of the strong wind mode, and the air conditioner 100 may compare an indoor fan motor driving voltage Vcc with a reference indoor fan motor driving voltage of the rated air flow rate (S103).

As a result of the comparison, when the indoor fan motor driving voltage Vcc is different from the reference indoor fan motor driving voltage of the rated air flow rate, the air conditioner 100 may store a current count value N of a current indoor fan motor RPM as a reference count value (S105).

Then, the air conditioner 100 may turn (change) into a driving condition setting mode and operate in indoor fan-only mode (S107). Here, in indoor fan-only mode, the air conditioner 100 may operate in a non-feedback control state.

The non-feedback control state may refer to a state of not receiving any control signals other than signals from the outdoor unit, such as signals from a wireless remote control, an autokey, a wired remote control, a repeater, etc.

Then, the air conditioner 100 may calculate a current indoor fan motor driving voltage (S109) and compare an average indoor fan motor RPMav with a target indoor fan motor RPM RPMtg (S111). In this regard, the current indoor fan motor driving voltage may be calculated by adding an initial indoor fan motor driving voltage and a product obtained by multiplying a current count value by a variation of the indoor fan motor driving voltage (ΔVcc).

As a result of comparison at operation S111, when the average indoor fan motor RPM is less than the target indoor fan motor RPM, the air conditioner 100 may compare a current indoor fan motor RPM and a minimum indoor fan motor RPM (S113).

As a result of comparison at operation S113, when the current indoor fan motor RPM is identical to the minimum indoor fan motor RPM, the air conditioner 100 may set the current state as the reference value of the rated air flow rate (S115). In this regard, the reference value of the rated air flow rate may be defined as a reference to maintain the discharge air flow rate in an optimal level.

In operation S115, the setting of the current state as the reference value of the rated air flow rate may be performed by setting the current indoor fan motor RPM as a reference indoor fan motor RPM of the strong wind mode, and indoor fan motor RPMs of the other wind modes based on the set reference indoor fan motor RPM of the strong wind mode may be set. For example, the current indoor fan motor RPM may be set as the reference indoor fan motor RPM of the strong wind mode, and indoor fan motor RPMs of the medium and mild wind modes may be respectively set to be less than the set reference indoor fan motor RPM of the strong wind mode by predetermined levels. On the contrary, a reference indoor fan motor RPM of the turbo mode may be set to be greater than the set reference indoor fan motor RPM of the strong wind mode by a predetermined level.

Meanwhile, when the average indoor fan motor RPM RPMav is greater than (or equal to) the target indoor fan motor RPM RPMtg in operation S111, the air conditioner 100 may compare a current indoor fan motor driving voltage Vcc with a maximum indoor fan motor driving voltage Vccmax after operation S111 (S117). As a result of the comparison at operation S111, when the current indoor fan motor driving voltage Vcc is greater than the maximum indoor fan motor driving voltage Vccmax, the air conditioner 100 may set the current state as the reference value of the rated air flow rate (S115). In operation S117, the maximum value of the indoor fan motor driving voltage may be limited so that the indoor fan motor may not be excessively driven.

Meanwhile, when the current indoor fan motor driving voltage Vcc is less than (or equal to) the maximum indoor fan motor driving voltage Vccmax in operation S117, the air conditioner 100 may change the current count value from N to N+1 (S119) and re-start from the calculation of the current indoor fan motor driving voltage of operation S109.

Meanwhile, when the current indoor fan motor RPM is not the same as the minimum indoor fan motor RPM RPMmin in operation S113, the air conditioner 100 may change the current count value from N to N−1 and re-start from the calculation of the current indoor fan motor driving voltage of operation S109.

Figure 4:
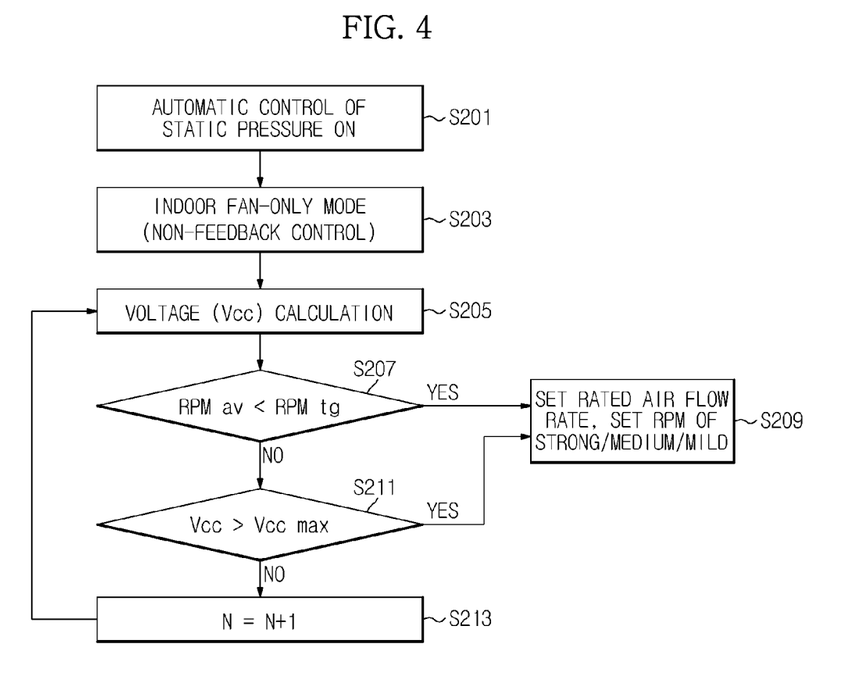
FIG. 4 is a flowchart for describing a method of controlling an air conditioner according to an embodiment of the disclosure.

FIG. 4 is a flowchart for describing a method of controlling an air conditioner according to an embodiment of the disclosure. In the following description, the setting of rated air flow rate conditions according to a duct environment during installation of a system air conditioner will be described.

For example, as the air conditioner 100 turns (changes) into a driving condition setting mode, the air conditioner 100 may operate in indoor fan-only mode (S201 and S203). Here, in indoor fan-only mode, the air conditioner 100 may turn (change) into a non-feedback control state. The non-feedback control state may refer to a state of not receiving any control signals other than signals from the outdoor unit, such as signals from a wireless remote control, an autokey, a wired remote control, a repeater, etc. That is, the air conditioner 100 may improve reliability of the result of setting the indoor fan motor RPM by temporarily blocking signals other than those related to the indoor fan to readjust the rated air flow rate conditions.

Then, the air conditioner 100 may calculate a current indoor fan motor driving voltage Vcc (S205) and compare an average indoor fan motor RPM RPMav with a target indoor fan motor RPM RPMtg (S207). In this regard, the current indoor fan motor driving voltage Vcc may be calculated by adding an initial indoor fan motor driving voltage and a product obtained by multiplying a current count value by a variation of the indoor fan motor driving voltage.

As a result of the comparison at operation S207, when the average indoor fan motor RPM is less than the target indoor fan motor RPM, the air conditioner 100 may set the current state as the reference value of the rated air flow rate (S209).

In this case, the air conditioner 100 may set the reference value of the rated air flow rate by setting the current indoor fan motor RPM as a reference indoor fan motor RPM of the strong wind mode, and RPMs of the indoor fan motor in the other wind modes may be set according to the set conditions based on the set reference indoor fan motor RPM of the strong wind mode. For example, the current indoor fan motor RPM may be set as the reference indoor fan motor RPM of the strong wind mode, and indoor fan motor RPMs of the medium and mild wind modes may respectively be set to be less than the set reference indoor fan motor RPM of the strong wind mode by predetermined levels. On the contrary, a reference indoor fan motor RPM of the turbo mode may be set to be greater than the set reference indoor fan motor RPM of the strong wind mode by a predetermined level.

Meanwhile, when the average indoor fan motor RPM RPMav is greater than (or equal to) the target indoor fan motor RPM RPMtg in operation S207, the air conditioner 100 may compare the current indoor fan motor driving voltage Vcc with a maximum indoor fan motor driving voltage Vccmax after operation S207 (S211). As a result of the comparison at operation S211, when the current indoor fan motor driving voltage Vcc is greater than the maximum indoor fan motor driving voltage Vccmax, the air conditioner 100 may set the current state as the reference value of the rated air flow rate (S209). In operation S209, the maximum value of the indoor fan motor driving voltage may be limited so that the indoor fan motor may not be excessively driven.

On the other hand, when the current indoor fan motor driving voltage Vcc is less than (or equal to) the maximum indoor fan motor driving voltage Vccmax in operation S211, the air conditioner 100 may change the current count value from N to N+1 (S213) and re-start from the calculation of the current indoor fan motor driving voltage of operation S205.

Although not shown herein, the air conditioner 100 may repeat operation of setting the reference value of the rated air flow rate while increasing the current count value up to the limited count value. When the average indoor fan motor RPM RPMav is greater than (or equal to) the target indoor fan motor RPM RPMtg, the air conditioner 100 may turn (change) back to the previous rated air flow rate conditions before the driving condition setting mode or maintain the initial rated air flow rate conditions and transmit an abnormal stop state to a wired remote control (not shown) when there are no previous conditions.

Figure 8:
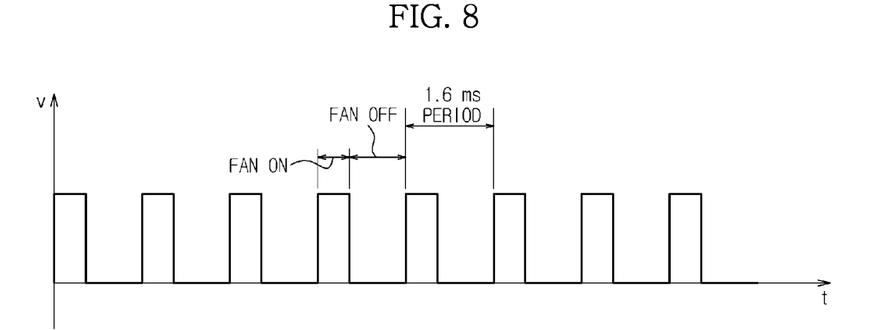
FIGS. 8 to 10 are waveform diagrams of output signals from a fan for describing a method of controlling an air conditioner.
Figure 9:
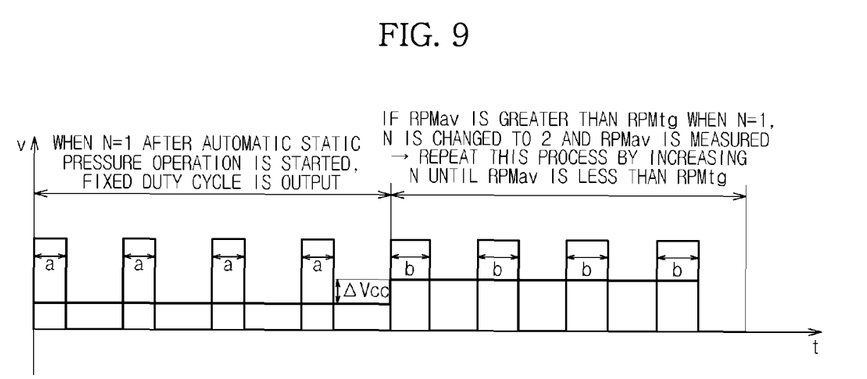
Figure 10:
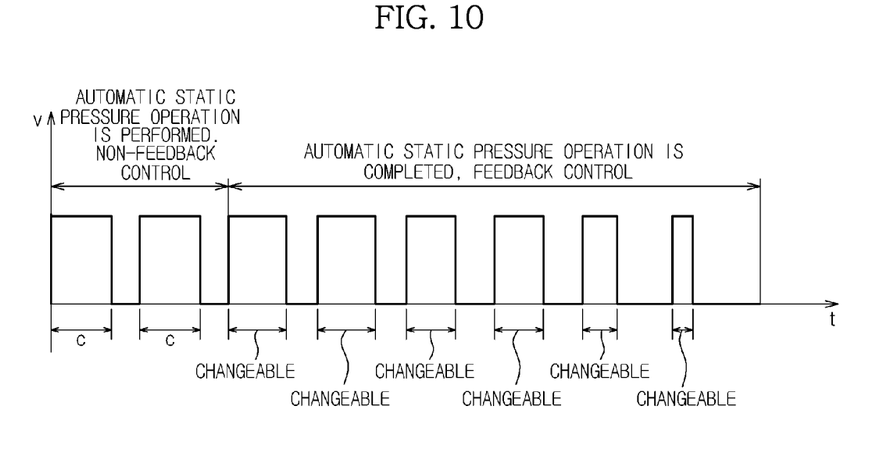

FIGS. 8 to 10 are waveform diagrams of output signals from a fan for describing a method of controlling an air conditioner.

As the air conditioner 100 turns (changes) into a driving condition setting mode, errors other than fan errors may be disabled, and an aging operation of duty cycle outputs may be performed for about 10 seconds (changeable) during an initial counting. In this regard, the aging operation may refer to an operation to maintain various parts and devices, if required, under the condition that an appropriate stress is applied thereto, for a predetermined time period until they are stabilized to a uniform state.

As illustrated in FIG. 8, when the indoor fan motor is a brushless direct current (BLDC) motor, the air conditioner 100 may control a period of a fan on ON and fan off OFF to be about 1.6 ms (changeable) during the aging operation.

As illustrated in FIG. 9, after the aging operation, the air conditioner 100 may calculate an average indoor fan motor RPM corresponding to a current count value (N=1) while the fixed duty cycle is output. When the calculated average indoor fan motor RPM is less than a target indoor fan motor RPM according to a pre-set table, the calculated average indoor fan motor RPM may be set as a reference indoor fan motor RPM of the strong wind mode. If, the average indoor fan motor RPM is greater than or equal to the target indoor fan motor RPM, the current count value may be changed to N=2, and an average indoor fan motor RPM may be measured again. This process may be repeated until the average indoor fan motor RPM is less than the target indoor fan motor RPM while increasing the current count value. However, this process may be repeated up to the limit of the count value of the air conditioner 100. That is, the air conditioner 100 outputs fixed duty cycles in the non-feedback control state in a driving condition setting mode and changes the duty cycle outputs at predetermined time intervals (FIG. 9) to set the rated air flow rate.

As illustrated in FIG. 10, when the setting of the reference value of the rated air flow rate is normally completed, the air conditioner 100 may inform a wired remote control of the completion of the setting and may change the non-feedback control state according to an automatic static pressure operation that sets the reference value of the rated air flow rate to a feedback control state. The feedback control state may be a state in which the fan on ON section may vary according to the feedback control while the control period may be the same as in FIG. 8, (e.g., about 1.6 ms).

In addition, as the air conditioner 100 quits from (terminates or ends) the driving condition setting mode, all disabled errors may be enabled.

According to the disclosed embodiments, the air conditioner may determine the reference value of the rated air flow rate based on a voltage input to the indoor fan motor and a static pressure of an installation environment without using a separate hardware when an environment changes (e.g., an installation environment change) or impurities are caused.

As is apparent from the above description, according to the air conditioner and the method of controlling the same, since the fan motor RPM is set by adjusting the driving voltage of the fan motor according to an external environment change caused by impurities such as dust or an installation environment change of the air conditioner, the discharge air flow rate may be maintained at a uniform level.

The apparatuses and methods according to the above-described example embodiments may use one or more processors. For example, a processing device may be implemented using one or more general-purpose or special purpose computers, and may include, for example, one or more of a processor, a controller and an arithmetic logic unit, a central processing unit (CPU), a graphics processing unit (GPU), a digital signal processor (DSP), a microcomputer, a field programmable array, a programmable logic unit, an application-specific integrated circuit (ASIC), a microprocessor or any other device capable of responding to and executing instructions in a defined manner.

The terms "module", and "unit," as used herein, may refer to, but are not limited to, a software or hardware component or device, such as a Field Programmable Gate Array (FPGA) or Application Specific Integrated Circuit (ASIC), which performs certain tasks. A module or unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

Aspects of the above-described example embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, USB memory, and the like. Examples of program instructions include both machine code, such as produced by a compiler, and files containing higher level code that may be executed by the computer using an interpreter. The program instructions may be executed by one or more processors. The described hardware devices may be configured to act as one or more software modules in order to perform the operations of the above-described embodiments, or vice versa. In addition, a non-transitory computer-readable storage medium may be distributed among computer systems connected through a network and computer-readable codes or program instructions may be stored and executed in a decentralized manner. In addition, the computer-readable storage media may also be embodied in at least one application specific integrated circuit (ASIC) or Field Programmable Gate Array (FPGA).

Although example embodiments of the disclosure have been shown and described, it would be appreciated by those skilled in the art that changes may be made to these embodiments without departing from the principles and spirit of the disclosure, the scope of which is defined in the claims and their equivalents.

What is claimed is:

1. An air conditioner, comprising:
an indoor fan motor driven according to a signal to control the indoor fan motor by a controller; and
the controller to reset a reference value of a rated air flow rate according to pre-set conditions based on an indoor fan motor driving voltage and an indoor fan motor RPM,
wherein the controller checks the indoor fan motor driving voltage when the indoor fan motor RPM reaches a reference value of the strong wind mode while the air conditioner operates in strong wind mode, compares the checked indoor fan motor driving voltage with a reference indoor fan motor driving voltage of the rated air flow rate, and resets the reference value when the checked indoor fan motor driving voltage is different from the reference indoor fan motor driving voltage of the rated air flow rate.

2. The air conditioner according to claim 1, wherein the controller resets the reference value of a rated air flow rate according to pre-set conditions based on an indoor fan motor driving voltage and an indoor fan motor RPM, when a request for resetting driving conditions is input by a user.

3. The air conditioner according to claim 1, wherein the controller comprises:
a driving mode controller to control the air conditioner to change into a driving condition setting mode and to operate in indoor fan-only mode under a non-feedback control state when the reference value of the rated air flow rate is to be adjusted while the air conditioner operates in strong wind mode;
a state checker to check an indoor fan motor driving voltage of the air conditioner in real time;
a driving condition setter to set the reference value of the rated air flow rate based on the indoor fan motor driving voltage and the indoor fan motor RPM checked by the state checker in indoor fan-only mode under the non-feedback control state; and
a motor controller to control driving of the indoor fan motor based on the reference value of the rated air flow rate set by the driving condition setter.

4. The air conditioner according to claim 3, further comprising a counter to manage a count value corresponding to the indoor fan motor RPM and to check the count value increasing or decreasing in accordance with the indoor fan motor RPM when the state checker checks the indoor fan motor RPM to reset the reference value of the rated air flow rate.

5. The air conditioner according to claim 3, wherein the state checker calculates a current indoor fan motor driving voltage by adding an initial indoor fan motor driving voltage and a product obtained by multiplying a current count value counted by the counter by a variation of the indoor fan motor driving voltage.

6. The air conditioner according to claim 3, wherein the driving condition setter compares an average indoor fan motor RPM with a target indoor fan motor RPM in indoor fan-only mode under the non-feedback control state, and sets the reference value of the rated air flow rate based on a corresponding indoor fan motor RPM, when the average indoor fan motor RPM is less than the target indoor fan motor RPM.

7. The air conditioner according to claim 3, wherein the driving condition setter compares an average indoor fan motor RPM with a target indoor fan motor RPM in indoor fan-only mode under the non-feedback control state, and requests the state checker to check the state when the average indoor fan motor RPM is greater than or equal to the target indoor fan motor RPM.

8. A method of controlling an air conditioner, the method comprising:
operating the air conditioner in a strong wind mode;
comparing an indoor fan motor driving voltage with a reference driving voltage of a rated air flow rate when an indoor fan motor RPM reaches a reference value of the strong wind mode;
storing a current count value of a current indoor fan motor RPM as a reference count value when the indoor fan motor driving voltage is different from the reference indoor fan motor driving voltage of the rated air flow rate;
changing into a driving condition setting mode and operating the air conditioner in an indoor fan-only mode;
comparing an average indoor fan motor RPM with a target indoor fan motor RPM;
comparing a current indoor fan motor RPM with a minimum indoor fan motor RPM when the average indoor fan motor RPM is less than the target indoor fan motor RPM based on the comparing of the average indoor fan motor RPM with the target indoor fan motor RPM; and
setting the current state as the reference value of the rated air flow rate when the current indoor fan motor RPM is equal to the minimum indoor fan motor based on the comparing of the current indoor fan motor RPM with the minimum indoor fan motor RPM.

9. The method according to claim 8, wherein the air conditioner changes into a non-feedback control state in the indoor fan-only mode.

10. The method according to claim 8, further comprising calculating a current indoor fan motor driving voltage by adding an initial indoor fan motor driving voltage and a product obtained by multiplying a current count value by a variation of the indoor fan motor driving voltage.

11. The method according to claim 8, wherein the setting of the current state as the reference value of the rated air flow rate is performed by setting the current indoor fan motor RPM as a reference indoor fan motor RPM of the strong wind mode, and setting reference indoor fan motor RPMs of other wind modes according to pre-set conditions based on the set reference indoor fan motor RPM of the strong wind mode.

12. The method according to claim 8, wherein when the average indoor fan motor RPM is greater than or equal to the target indoor fan motor RPM, the method further comprises:
comparing a current indoor fan motor driving voltage with a maximum indoor fan motor driving voltage; and
setting the current state as the reference value of the rated air flow rate when the current indoor fan motor driving voltage is greater than the maximum indoor fan motor driving voltage based on the comparing of the current indoor fan motor driving voltage with the maximum indoor fan motor driving voltage.

13. The method according to claim 12, further comprising increasing the current count value by one level and re-calculating the current indoor fan motor driving voltage, when the current indoor fan motor driving voltage is less than or equal to the maximum indoor fan motor driving voltage.

14. The method according to claim 8, further comprising decreasing the current count value by one level and re-calculating the current indoor fan motor driving voltage, when the current indoor fan motor RPM is different from the minimum indoor fan motor RPM.

15. A method of controlling an air conditioner, the method comprising:
  changing into a driving condition setting mode and operating the air conditioner in an indoor fan-only mode;
  comparing an average indoor fan motor RPM with a target indoor fan motor RPM; and
  setting a current state as a reference value of the rated air flow rate when the average indoor fan motor RPM is less than the target indoor fan motor based on the comparing of the average indoor fan motor RPM with the target indoor fan motor RPM.

16. The method according to claim 15, wherein the air conditioner changes into a non-feedback control state in the indoor fan-only mode.

17. The method according to claim 15, further comprising calculating a current indoor fan motor driving voltage by adding an initial indoor fan motor driving voltage and a product obtained by multiplying a current count value by a variation of the indoor fan motor driving voltage.

18. The method according to claim 15, wherein the setting of the current state as the reference value of the rated air flow rate is performed by setting the current indoor fan motor RPM as a reference indoor fan motor RPM of the strong wind mode, and setting reference indoor fan motor RPMs of other wind modes according to pre-set conditions based on the set reference indoor fan motor RPM of the strong wind mode.

19. The method according to claim 15, wherein when the average indoor fan motor RPM is greater than or equal to the target indoor fan motor RPM, the method further comprises:
  comparing a current indoor fan motor driving voltage with a maximum indoor fan motor driving voltage; and
  setting the current state as the reference value of the rated air flow rate when the current indoor fan motor driving voltage is greater than the maximum indoor fan motor driving voltage based on the comparing of the current indoor fan motor driving voltage with the maximum indoor fan motor driving voltage.

20. The method according to claim 19, further comprising increasing the current count value by one level and re-calculating the current indoor fan motor driving voltage, when the current indoor fan motor driving voltage is less than or equal to the maximum indoor fan motor driving voltage.

21. An air conditioner, comprising:
  an indoor fan motor driven in response to a control signal; and
  a controller to provide the control signal to the indoor fan motor, the controller further comprising:
    a driving mode controller to control the air conditioner to change into a driving condition setting mode and to operate in an indoor fan-only mode under a non-feedback control state, and
    a driving condition setter to determine whether an average indoor fan motor RPM is less than a target indoor fan motor RPM when the air conditioner operates in the indoor fan-only mode under the non-feedback control state, to determine whether a current indoor fan motor RPM is equal to a minimum indoor fan motor RPM when it is determined the average indoor fan motor RPM is less than the target indoor fan motor RPM, and to set a current state as a reference value of a rated air flow rate to maintain a desired air flow rate of the air conditioner when it is determined the current indoor fan motor RPM is equal to the minimum indoor fan motor RPM.

22. The air conditioner according to claim 21, wherein the driving condition setter determines whether a current indoor fan motor driving voltage is greater than a maximum indoor fan motor driving voltage Vccmax when it is determined the average indoor fan motor RPM is not less than the target indoor fan motor RPM, and sets a current state as a reference value of a rated air flow rate to maintain the desired air flow rate of the air conditioner when it is determined the current indoor fan motor driving voltage is greater than the maximum indoor fan motor driving voltage Vccmax.

23. The air conditioner according to claim 21, wherein the driving mode controller controls the air conditioner to change into the driving condition setting mode and to operate in the indoor fan-only mode when the air conditioner operates in a strong wind mode and an indoor fan motor driving voltage differs from a reference fan motor driving voltage of the desired air flow rate.

* * * * *